United States Patent [19]
Holdsworth

[11] 3,914,839
[45] Oct. 28, 1975

[54] FILE HOLDER
[75] Inventor: Sydney Geoffrey Holdsworth, London, Canada
[73] Assignee: Webster Mfg. (London) Limited, London, Canada
[22] Filed: July 26, 1974
[21] Appl. No.: 492,166

[30] Foreign Application Priority Data
May 29, 1974 Canada .................................. 201167

[52] U.S. Cl. .............................. 29/80; 29/78; 76/88; 280/11.37
[51] Int. Cl.² ...................... B23D 71/04; B23D 71/00; B21K 5/12; A63C 3/00
[58] Field of Search ................ 29/78, 80; 76/88, 36; 280/11.37

[56] References Cited
UNITED STATES PATENTS

| | | | |
|---|---|---|---|
| 231,890 | 9/1880 | Austin | 29/80 |
| 312,012 | 2/1885 | Phelps | 29/80 X |
| 1,375,634 | 4/1921 | Hanigan | 29/80 |
| 2,515,469 | 7/1950 | Power | 29/80 |
| 3,391,946 | 7/1968 | Luff | 280/11.37 |

Primary Examiner—Harrison L. Hinson
Attorney, Agent, or Firm—Finnegan, Henderson, Farabow and Garrett

[57] ABSTRACT

Disclosed is a device for holding a conventional file either in the vertical (on edge) or in a horizontally flat position. It is composed of two symmetrical body members having front and rear panels and an upper surface extending into a margin disposing a linear recess for approximately one half its length and a protruding linear finger along the balance of the margin. Each body member has a stepped recess in its front and rear panels. As such, when the two symmetrical body portions are placed in adjacent relation, along the margins, the recesses and fingers mate to form a gimbal joint providing relative vertical and lateral movement of the body members. A thumb screw is provided through the body members permitting the same to be turned down and to bring the body members towards each other, about the gimbal joint while the opposite stepped recesses then engage the profile of the file to constrain the same in the vertical, or horizontally flat positions.

12 Claims, 12 Drawing Figures

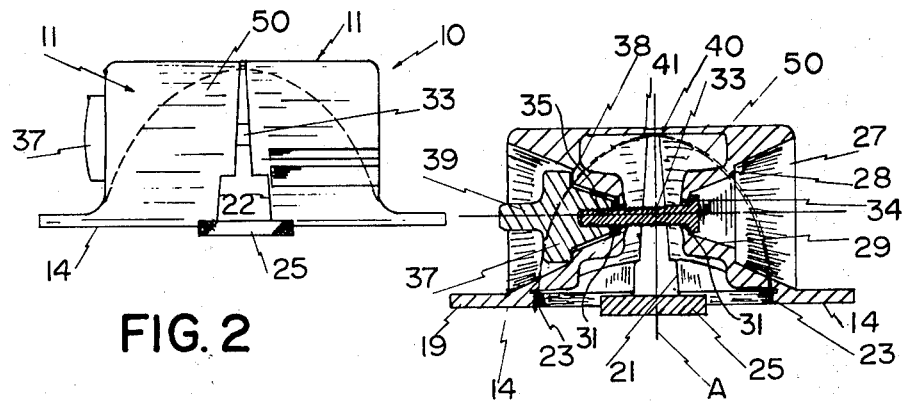
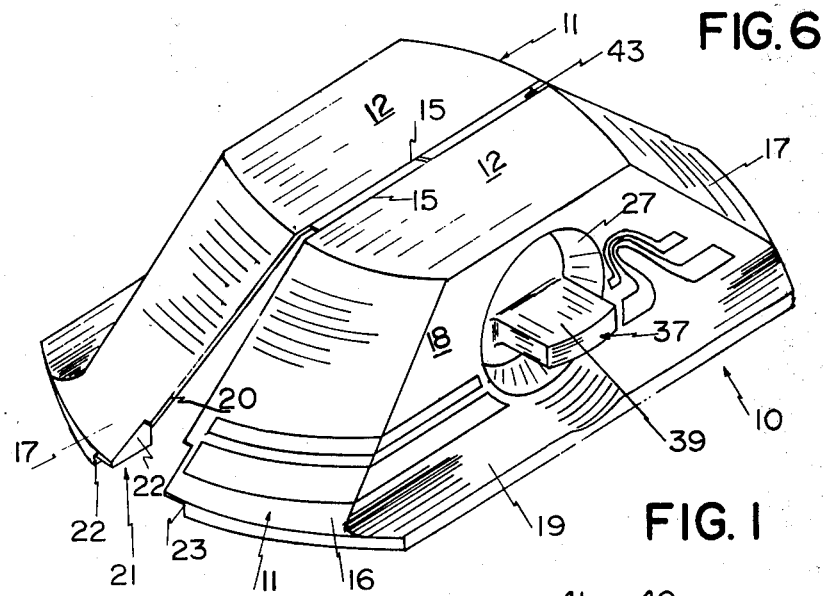
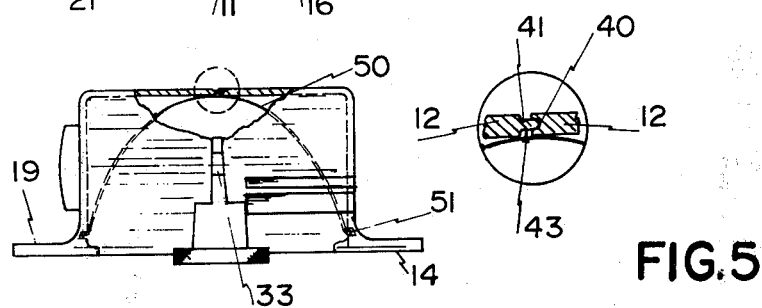

FILE HOLDER

This invention relates to a file holder.

File holders of various types have been available but they generally suffer from two prime disadvantages. Firstly, either the file and the handle or holder thereof are integral whereby when the file wears out the handle as well must be discarded; or, secondly where holders or handles are removable or disengagable from the file, their use is restricted to a single type of file or profile of file and may not readially be used with files of other profiles, tapers, or cuts, ie. bastard, fine course. As a tertiary complaint, prior art file holders or handles do not permit holding of a file in the flat and as well on edge wherein at the same time the holder acts as the guide to the file, when a narrow edge is filed true. This is most accute in the filing of bases and edges of snow skis.

Ideally, in the sharpening of snow ski edges, the base or sole of the ski is first filed flat and smooth (which also removes burrs in the base) and the edge of the ski is then filed or honed almost at right angles to the sole so that the running metal edge of the ski is honed almost into a 90° exterior angle. In modern skis the running metal edges are fabricated with such hard steels and alloys that any file used to file the edges has but a short life span.

It is an object of the present invention to provide a file holder which acts as a handle for the file and in some respects as an anvil or guide for the file, during use.

It is also an object of the invention to provide a holder which may be used with many different files.

It is also an object of the present invention to provide a file holder which secures within it a file in either the flat or on an edge and yet self accomodates files of different types and profiles.

It is also a further object of the present invention to provide a file holder which may be used with a whole, or a segment of a file.

The present invention, therefore, achieves a file holder for holding a file, the holder comprising two body members, swivel hinge means connecting the body members and providing relative pivotal and lateral movement of the body members, engaging means carried by a body member for engaging the file, and securing means for constraining the body members in a position about the swivel hinge to urge the engaging means against the file and to hold the file in the holder.

The invention also achieves a file holder for holding a file, the holder comprising two symmetrical body members, each body member with a unitary front and rear panel extending downward into a base and laterally upward into an upper surface, which extends into an upper margin disposing along one portion, thereof, a linear recess, along another portion thereof a colinear protruding linear finger, means disposing abutments in proximity to the base for engaging the file, means for holding the abutments in engaging relationship with the file while the linear finger of one body member engages the linear recess of the other body member to form a gimbal joint, the means for holding is adapted to constrain the abutments in engaging relationship with the file so as to dispose the surface of the file in a non coincident plane to that of the base.

The embodiments of the invention will now be described by way of example with reference to the accompanying drawings in which:

FIG. 1 is a perspective view of a file holder employing embodiments of the present invention.

FIG. 2 is a front view of the file holder of FIG. 1 with a file disposed therein in the flat.

FIG. 4 is the front view of FIG. 2 partially in section showing the gimbal joint.

FIG. 5 is an exploded sectional view of the gimbal joint or swivel hinge of FIG. 4.

FIG. 6 is the section along lines VI—VI of FIG. 3.

Figure 3:
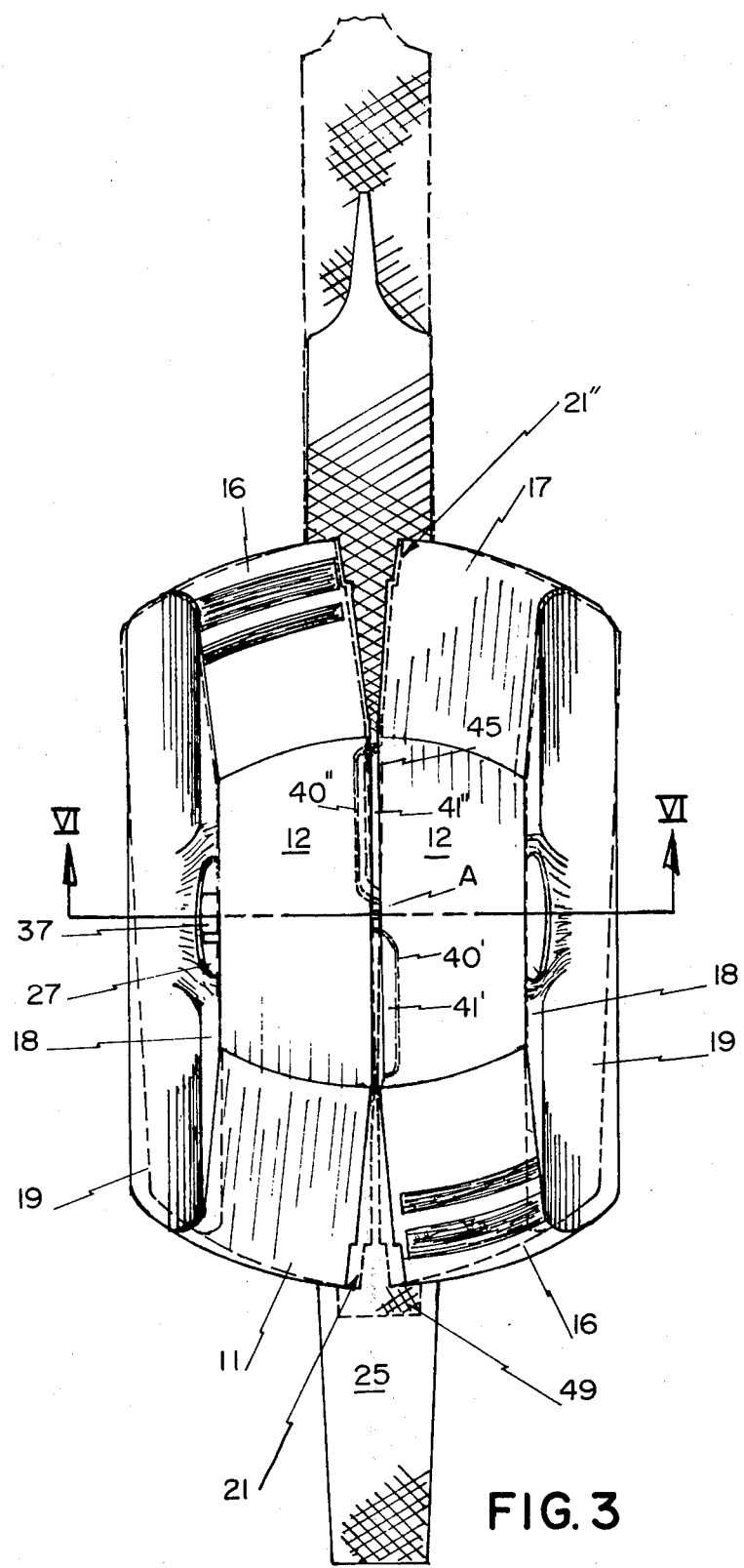
FIG. 3 is a plan view of the file holder of FIG. 1.
Figure 7:
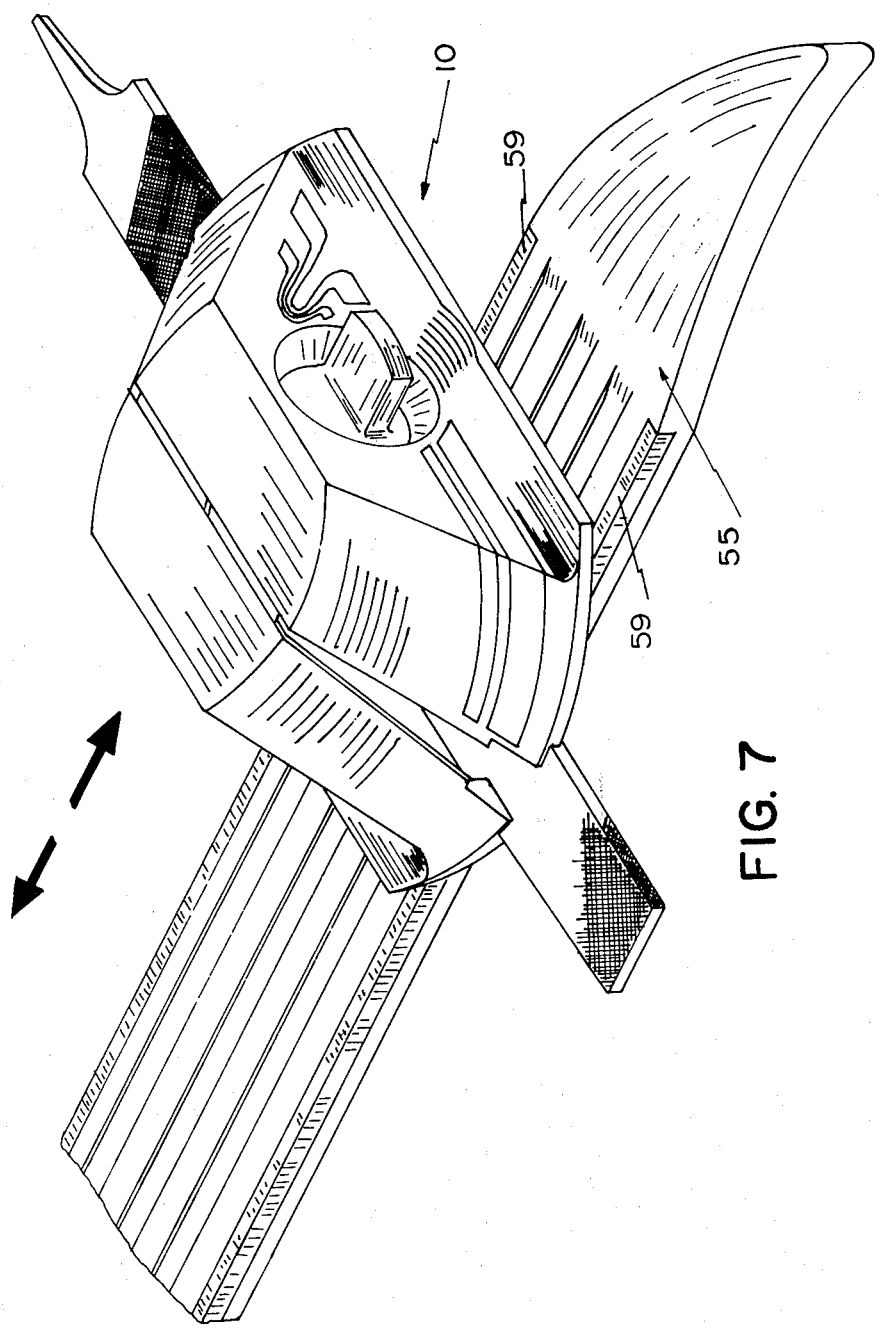
FIG. 7 is a perspective view of the holder of FIG. 1 in use for filing the base of snow skis, the file in the flat.

Referring to FIG. 1, a file holder 10 includes two symmetrical body members 11, having an upper partially arcuate surface 12, extending into an essentially flat surface base or sole 14. The body portion 11 has a front 16 and a rear 17 curved surface or panel and depending straight side 18 extending into a lateral flange 19 which is intergral with the base 14. The contours of the upper surface 12, front 16 and rear 17 panels are selected such that the holder will easily fit into the palm of one's hand, but they are not critical to the embodiments of the invention.

Figure 10:
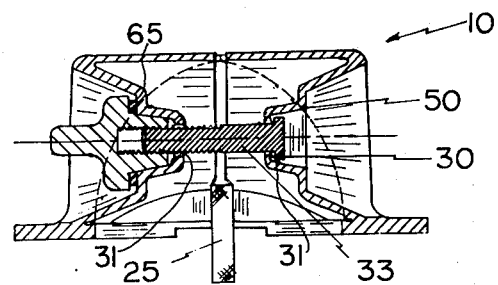
FIG. 10 is the sectional view of FIG. 6 showing an alternative embodiment of the thumb screw construction.

The front 16 and 17 panels, each are provided along the distal margin 20, with an abutment 21 preferably a step recesses which include two steps, an upper step 22 for engaging the flat of a file 25 and a lower step 23 for engaging the narrow or waist of the file 25. The extent of the upper step 22 and the depth of that step are selected so that the depth is somewhat less than one half of the thickness of the thinnest file to be used, and the extent of the step is such as to permit a portion of the file to extend below the sole 14 as seen in FIG. 10. The extent of the lower step 23 is not critical save that it should be not too large. The depth of the lower step 23, however, should be somewhat less then the thickness of the thinnest file to be used as will be appreciated on perusal of FIGS. 2 and 6.

Each body member 11 is provided, center of the straight side 18, with a frusto-conical recess 27 having annular waist 28 extending into a tapered polygonal region 29 (frusto-pyramid) defining at its terminal end a slightly concave bottom 30 and an orifice 31 centered therein.

Referring in detail to FIG. 6, a bolt 33 with flat square head 34 extends through one orifice 31 of one of the body members 11 into the symmetrical conical recess 27 of the other body member, that is through its orifice 31 and frusto-pyramid region 29 to dispose bolt threads 35 into the conical recess 27 thereof. A thumb screw 37 with flat annular base 38 and obverse projecting thumb bar 39 is fashioned to insert into the recess 27 and to engage the threads 35. When turned down, the flat base 38 of the thumb screw 37 urges against the annular waist 28 and draws the sy-metrical step recesses 21 toward each other. This drawing of the recesses 21 towards each other is accommodated by a gimbal joint 43 which extends along the upper margin 15 of the upper surface 12. The gimbal joint 43 consists of, along one portion of the upper margin 15, a linear channel 40 extending along one half the length of the upper margin 15 and a co-linear protruding finger 41 along the balance of the upper margin 15. Since the body members 11 are symmetrical, the co-linear finger 41 of one body member is adapted to engage into the proximate linear channel or recess 40 of the other body member in a fashion as noted in FIG. 5 to form a gimbal joint 43. This allows relative pivoting of the body members about the gimbal joint 43 in the vertical, and hence permits, on turning down of the thumb screw 37, migration of the stepped recesses 21 toward each other to engage the surfaces of the file whether the file be disposed in the vertical or flat; the gimbal joint 43 also allows relative lateral movement of the body members 11 as will be explained.

Figure 9:
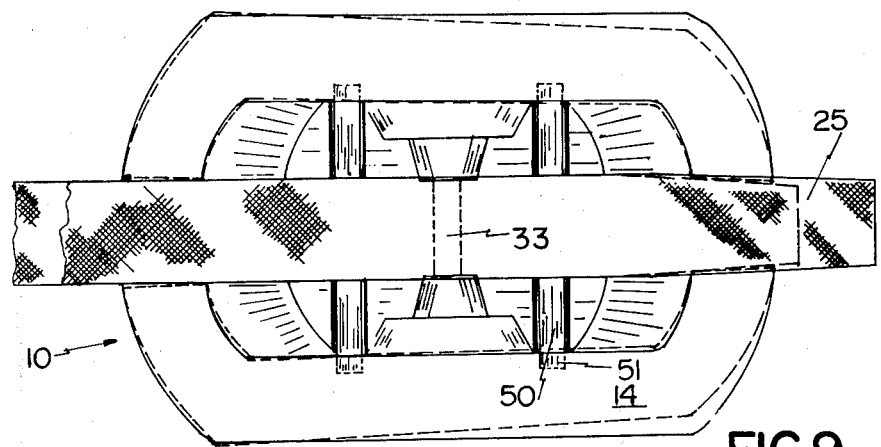
FIG. 9 is a bottom view of the file holder holding a file in the flat, at its centre, and at its tip.

Referring to FIG. 9, in order to assist in turning down of the thumb screw 37, and hence clamping of the file 25 by the stepped recesses, the body members are biased away from each other by a pair of internally disposed arcuate leaf springs 50, one fore and one aft, disposed in the interior of the symmetrical body members 11, and, on referring to FIGS. 4 and 9, the ends of the arcuate leaf springs 50 bend into spring retaining slots 51 dispose on the inside edge of the base or sole 14.

Referring to FIG. 3, the effect of the symmetrical protruding linear fingers 41 mating into the symmetrical linear recess 40 permit, the gimbal joint 43 to swivel in the lateral, and hence the body members, and to lever about a fulcrum at point A as shown in FIG. 3. This is particularily useful when the file 25 is positioned with its tip 49 at engagement with one symmetrical pair of abutments 21 as shown in relief in FIG. 3 as file 25′. Thus, the lateral finger 41″ extends less into its mating channel 40″ as at 45 then the lateral finger 41′ into its mating channel 40″ since the tip 49 of the file 25 is in engagement with one symmetrical pair of abutments 21 at 21′, in FIG. 3 while the other pair of symmetrical abutments 21 are spaced further apart than normal as at 21″.

Now referring to FIG. 10, it is preferred to provide a washer 65 of resilient material, such as a plastic washer under the seat of the thumb screw 37 so as to provide a cushion when thumb-bar 39 is turned down. This is especially useful in cold weather use of the file holder since the metal of the holder and its components tend to bind.

Figure 8:
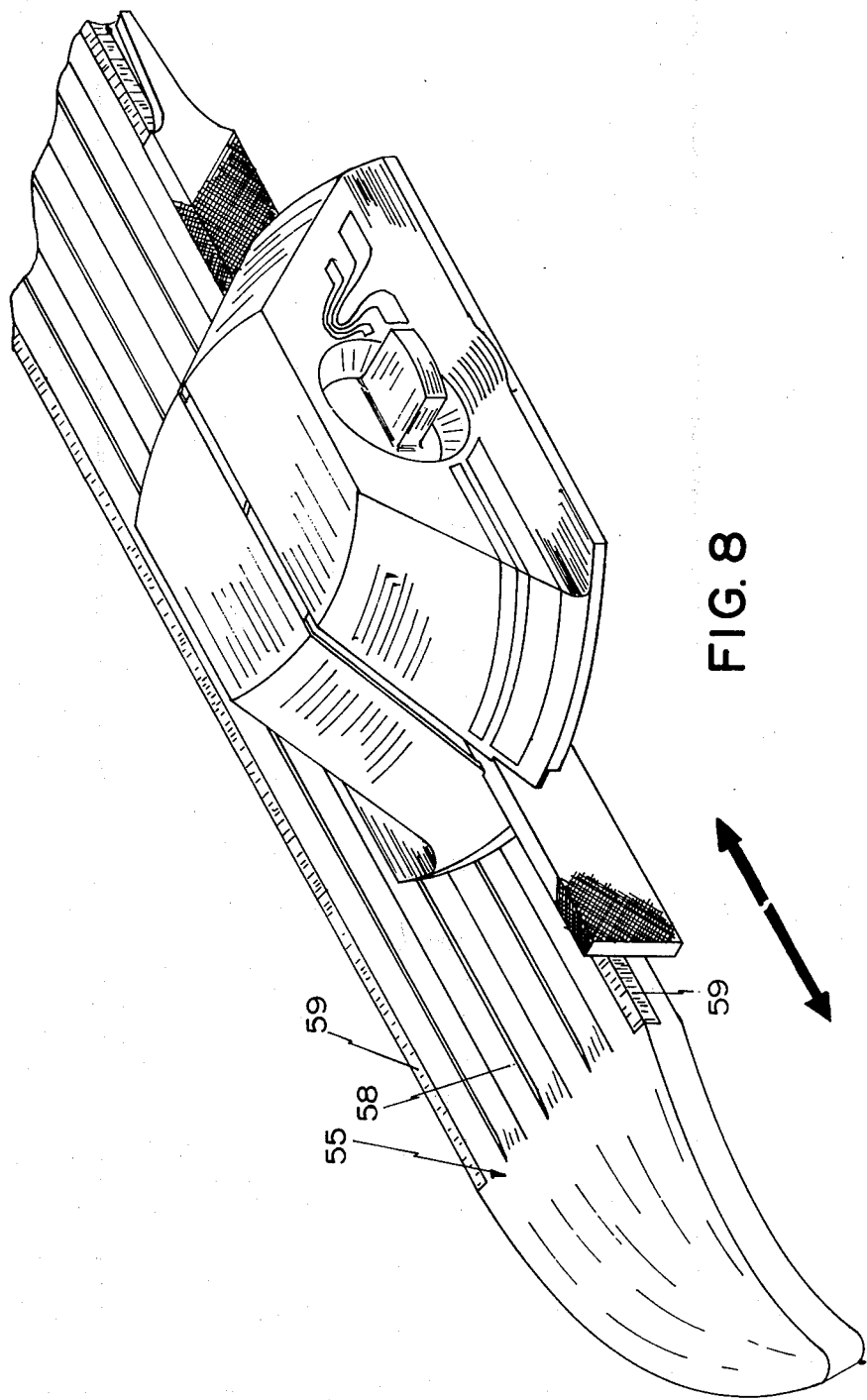
FIG. 8 is a perspective view of the file holder of FIG. 1, in use in filing the edges of the snow ski with the file in the vertical.
Figure 11:
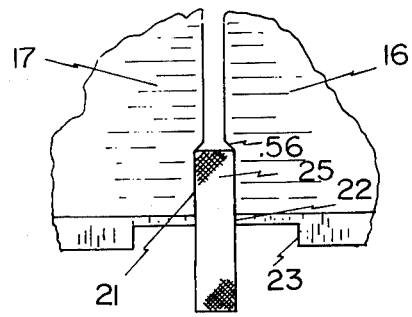
FIGS. 11 and 12 are alternative embodiments of the stepped recess (abutment) showing its accomodation for a thinner file in the vertical.
Figure 12:
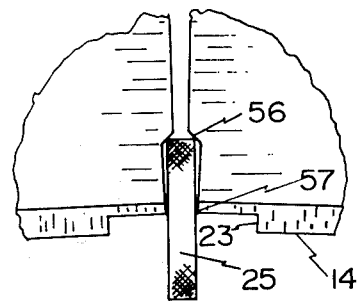

Referring to FIGS. 11 and 12, it is preferred, in order to accomodate, in the vertical, files of different thicknesses as those of bastard, course, etc., that the upriser of the upper step 22, of the stepped recess 21 extend into a tapered segment 56 toward the margin 21. If the tapered segment 56 engages the corner of the file 25 when the thickness of that file is less than the depth of the step. As shown in FIG. 12, the tow 57 of the upper step 22 then engages the flat of the file. As such there are four points of contact with the file at each of the stepped recesses or abutments and the file 25 is not only held secure and free from wobble but also essentially square to the effective plane of the base 14. Actually, with thinner files, the flat base 14 of the body members 11 are not disposed in a plane but rather relatively inclined in the obtuse, out of plane some 3° to 4°. This is satisfactory, as skiers prefer ski edges not to be square to the base or sole of skis but at an angle slightly accuate, ie. 85° to 88°. If the sole 14 of the file holder is placed flat on the sole of a ski, referring to FIG. 8 the holder sole 14 will act as the anvil or guide along the sole 58 of the ski 55 so that the edge 59 of the ski is filed at this slightly accuate angle.

The embodiments of an invention in which an exclusive property or privilege is claimed are defined as follows:

1. A file holder for holding a file, the holder comprising two symmetrical body members, each body member having a unitary front and rear panel extending downward into a base and laterally upward into an upper surface, which extends into an upper margin disposing along one portion, thereof, a linear recess, along another portion thereof a co-linear protruding linear finger, means disposing abutments in proximity to the base for engaging the file, means for holding the abutments in engaging relationship with the file while the linear finger of one body member engages the linear recess of the other body member to form a gimbal joint, the means for holding being to constrain the abutments in engaging relationship with the file so as to dispose the surface of the file in a non co-incident plane to that of the base.

2. A file holder for holding a file, the holder comprising two symmetrical body members, each body member with a unitary front and rear panel extending downward into a base and laterally upward into an upper surface, which extends into an upper margin disposing along one portion, thereof, a linear recess, along another portion thereof a co-linear protruding linear finger, the panels disposing abutments in proximity to the base for engaging the file, means for holding the abutments in engaging relationship with the file while the linear finger of one body member engages the linear recess of the other body member to form a gimbal joint, the means for holding adapted to constrain adjacent abutments in engaging relationship with the file so as to dispose the surface of the file in a non co-incident plane to that of the base.

3. The file holder as claimed in claim 1, including means biasing proximate abutments away from each other and against said holding means.

4. The file holder as claimed in claim 1 wherein an abutment includes a two stepped recess.

5. The file holder as claimed in claim 4, wherein one step is disposed in the base.

6. The file holder as claimed in claim 5 wherein said one step has a nominal depth less than the thickness of a file.

7. The file holder as claimed in claim 4 wherein one step is disposed in a margin of the body member and the extent of the step is such as to dispose a surface of the file beneath the surface of the base.

8. The file holder as claimed in claim 2 wherein the abutment is a two stepped recess comprising a lower step disposed in the base and an upper step disposed in the margin of the panel, said upper step having an upriser which extends as a tapered segment inclined at an accute angle to the base.

9. The file holder as claimed in claim 8 wherein the accute angle is 45°.

10. The file holder as claimed in claim 1 wherein means for holding comprises a connecting member extending between the body members and disposed between the gimbal joint and base.

11. The file holder as claimed in claim 10 including means to pivot one end of the connecting member relative to a body member.

12. The file holder as claimed in claim 1 wherein means for holding includes a recess disposed in the body member between the gimbal joint and base, said recess disposing a concave bottom with an appeture therein, a bolt mounted in the recess to extend through the appeture into the co-responding symmetrical appeture of the other symmetrical body member and into its recess so as to expose in the threads of the bolts therein, and a nut engaging the said threads in the recess whereby turning down of the nut draws the corresponding proximate abutments of each symmetrical body member toward each other.

* * * * *